(12) United States Patent
Kellerer et al.

(10) Patent No.: US 7,760,661 B2
(45) Date of Patent: Jul. 20, 2010

(54) APPARATUS AND METHOD FOR GENERATING A TRANSMIT FRAME

(75) Inventors: Wolfgang Kellerer, Furstenfeldbruck (DE); Eckehard Steinbach, Olching (DE); Wei Tu, Munich (DE)

(73) Assignee: NTT DoCoMo, Inc., Tokyo (JP)

( * ) Notice: Subject to any disclaimer, the term of this patent is extended or adjusted under 35 U.S.C. 154(b) by 444 days.

(21) Appl. No.: 11/638,833

(22) Filed: Dec. 13, 2006

(65) Prior Publication Data

US 2007/0154065 A1 Jul. 5, 2007

(30) Foreign Application Priority Data

Jun. 15, 2004 (WO) ............... PCT/EP2004/006438

(51) Int. Cl.
*H04J 3/16* (2006.01)
(52) U.S. Cl. .................. 370/252; 370/471; 370/474
(58) Field of Classification Search ............... 370/437, 370/473; 382/128, 130, 131
See application file for complete search history.

(56) References Cited

U.S. PATENT DOCUMENTS

| | | | |
|---|---|---|---|
| 5,748,768 A * | 5/1998 | Sivers et al. ............... | 382/130 |
| 5,953,506 A | 9/1999 | Kalra et al. | |
| 7,403,183 B2 * | 7/2008 | Someya ............... | 345/98 |
| 2002/0010938 A1 | 1/2002 | Zhang et al. | |
| 2003/0067877 A1 | 4/2003 | Sivakumar et al. | |
| 2005/0169312 A1 * | 8/2005 | Cakareski et al. ........... | 370/473 |
| 2005/0200757 A1 * | 9/2005 | Pica et al. ............... | 348/390.1 |

OTHER PUBLICATIONS

Keller, et al., "An Active Router Architecture for Multicast Video Distribution," IEEE, pp. 1137-1146 (2000).
Romanow, "Dynamics of TCP Traffic over ATM Networks," IEEE, pp. 633-641 (1995).
Ravindra, et al., "Active Router Approach for Selective Packet Discard of Streamed MPEG video under Low Bandwidth Conditions," IEEE, pp. 739-742 (2000).
Tennenhouse, et al., "A Survey of Active Network Research," pp. 1-14.
Computer Networks, 4th Edition, Andrew S. Tanenbaum, p. 184.
International Search Report and the Written Opinion of the International Searching Authority, or the Declaration (dated Feb. 23, 2005).
Notification of Transmittal of the International Preliminary Report on Patentability dated Nov. 13, 2006.

* cited by examiner

*Primary Examiner*—Ricky Ngo
*Assistant Examiner*—Rasheed Gidado
(74) *Attorney, Agent, or Firm*—Nutter McClennen & Fish LLP; John J. Penny, Jr.

(57) ABSTRACT

An apparatus for generating a transmit frame from an information signal, the information signal comprising a first information frame and a second information frame, comprises a provider for providing a first reconstruction distortion value indicating a reconstruction distortion when replacing the first information frame by a replacement frame, and for providing a second reconstruction distortion value indicating a reconstruction distortion when replacing the second information frame by a replacement frame, means for introducing either the first information frame or the second information frame into the transmit frame in dependence on the first reconstruction distortion value or in dependence on the second reconstruction value. In accordance with the present invention, a rate-distortion optimized rate reduction can be achieved.

14 Claims, 7 Drawing Sheets

FIG. 6

| Name | Length | Bit rate | PSNR(dB) |
|---|---|---|---|
| Foreman | 299 frames | 107kbps | 36.28 |
| Akiyo | 279 frames | 35kbps | 38.94 |
| Carphone | 289 frames | 106kbps | 36.93 |
| Grandmother | 269 frames | 42kbps | 36.99 |

APPARATUS AND METHOD FOR GENERATING A TRANSMIT FRAME

CROSS-REFERENCE TO RELATED APPLICATION

This application is a continuation of copending International Application No. PCT/EP2004/006438, filed Jun. 15, 2004, which designated the United States.

BACKGROUND OF THE INVENTION

1. Field of the Invention

The present invention is in the field of telecommunications and, in particular, in the field of signal transmission over a communication network, e.g. internet.

2. Description of the related art

Video streaming over the internet—or any other kind of network where the resources are shared by many users—always faces the problem that at one or more points along the path the incoming rate at a network node might be higher than the outgoing rate. This leads to an increasing buffer-fullness of that node and eventually to packet loss. For video signals, if more traffic arrives than the outgoing links can support, the video data either has to be transcoded to lower rate or video packets have to be dropped.

Transcoding is computationally expensive and random frame dropping can have a negative influence on the video quality. Scalable video offers the opportunity to drop less important parts of the video bit stream first, which leads to graceful degradation as traffic increases.

Quality of service (QOS) labelling of the video packets together with priority mechanisms in the network node support importance-controlled dropping of the data. The label (or importance) of the packets is determined by the sender before transmission and does not include the actual transmission situation. This is a disadvantage as the importance of a packet might change along the transmission path.

In the following and by the way of example, a video stream with temporal scalability will be considered which has the following group of picture structure: IBBPBBP . . . If a network node drops a B-frame the other frames are not affected. If, however, the P-frame after the I-frame is dropped, all following frames (B- and P-frames) up to the next I-frame will be affected as they depend on the dropped frame. Therefore, if it is known that the first P-frame has to be dropped, then the importance of all following frames changes. Although, usually, only a few different importance labels are present, different frames with the same label will still have different influence on the reconstruction quality at the receiver.

As it is known from the rate-distortion theory by C. Shannon, an information distortion increases as the rate decreases. In this context, the term "distortion" refers to some measure of a difference between e.g. samples of a signal having a certain rate and samples of the signal after rate reduction.

If, for example, a certain frame within the group of pictures is dropped, then an increased distortion associated with rate reduction achieved by frame dropping can be observed. At a receiver, an information loss associated with the missing frame can at least partially be compensated at the receiver when a concealment strategy, e.g. reconstructing the missing frame by introducing e.g. a previously received frame comprising some information also comprised by the missing frame. Therefore, after applying the concealment strategy at the receiver, a resulting reconstruction distortion may be different than the distortion when not applying any concealment strategy. In the following, the term "reconstruction distortion" denotes a resulting information distortion observed at the receiver after applying a concealment strategy, e.g. replacing missing frames by other frames.

Ralph Keller, Sumi Choi, Dan Decasper, Marcel Dasen, George Fankhauser and Bernhard Plattner, describe in "An Active Router Architecture for Multicast Video Distribution," Proc. Infocom 2000, Tel Aviv, Israel, March 2000, a dropping strategy for scalable video that can be implemented on active routers. However, the dropping decision is not made in a rate-distortion optimum way, since after applying the dropping strategy disclosed therein, the distortion may significantly be increased. G. Ravindra, N. Balakrishnan, K. R. Ramakrishnan disclose in "Active Router Approach for Selective Packet Discard of Streamed MPEG Video under Low Bandwidth Conditions." Proc. ICME 2000, New York, July 2000, a video frame dropping strategy that discards all those frames that depend on previously dropped frames. However, the dropping decision does not consider many simultaneous video streams in a rate-distortion optimum way, so that certain video streams suffer from significantly higher distortion than other video streams.

SUMMARY OF THE INVENTION

It is an object of the present invention to provide a rate-distortion optimized concept for rate reduction.

In accordance with a first aspect, the present invention provides an apparatus for generating a transmit frame from an information signal, the information signal comprising a plurality of information frames, the apparatus having: a provider configured for providing a plurality of reconstruction distortion values, each reconstruction distortion value indicating a reconstruction distortion resulting when replacing an information frame by a replacement frame; a means configured for minimizing a cost function reflecting a combination of rate reduction and an increase of a total reconstruction distortion resulting when non-introducing a combination of frames into the transmit frame, the means being further configured for determining a dropping pattern minimizing the cost function from the minimization of the cost function, the dropping pattern indicating a combination of information frames not to be introduced into the transmit frame, the means being further configured for dropping the combination of information frames indicated by the dropping pattern and for introducing the information frames which are not to be dropped into the transmit frame.

In accordance with a second aspect, the present invention provides a communication network node having: a receiver for receiving an information signal; the above-mentioned apparatus for generating a transmit frame from the information signal; and means for generating a transmit signal on a basis of the transmit frame.

In accordance with a third aspect, the present invention provides an apparatus for generating a transmit signal from an information signal, the information signal comprising an information frame, the apparatus having: a provider for providing a reconstruction distortion value in a mean squared error sense indicating a reconstruction distortion when replacing the information frame by a replacement frame; and a combiner for combining the information signal and the reconstruction distortion value as side information in order to obtain the transmit signal.

In accordance with a fourth aspect, the present invention provides an apparatus for reconstructing a missing frame in a receive frame, the receive frame comprising a frame information as side information indicating a kind of missing frame of at least two kinds of frames, the apparatus having: means for detecting the frame information as side information in the receive frame; and means for generating a replacement frame for the missing frame in response to the frame information in order to construct the missing frame, a kind of the replacement frame matching the kind of the missing frame.

In accordance with a fifth aspect, the present invention provides a method for generating a transmit frame from an information signal, the information signal comprising a plurality of information frames, the method having the steps of: providing a plurality of reconstruction distortion values, each reconstruction distortion value indicating a reconstruction distortion when replacing an information frame by a replacement frame; minimizing a cost function reflecting a combination of rate reduction and an increase of a total reconstruction distortion resulting when non-introducing a combination of frames into the transmit frame; determining a dropping pattern minimizing the cost function form the minimization of the cost function, the dropping pattern indicating a combination of information frames not to be introduced into the transmit frame; dropping the combination of information frames indicated by the dropping pattern; and introducing the information frames which are not to be dropped into the transmit frame.

In accordance with a sixth aspect, the present invention provides a method for forwarding signals, the method having the steps of: receiving an information signal; generating a transmit frame from an above-mentioned information signal; and generating a transmit signal on a basis of the transmit frame.

In accordance with a seventh aspect, the present invention provides a method for generating a transmit signal from an information signal, the information signal comprising an information frame, the method having the steps of: providing a reconstruction distortion value in a mean squared error sense indicating a reconstruction distortion when replacing the information frame by a replacement frame; and combining the information signal and the reconstruction distortion value as side information in order to obtain the transmit signal.

In accordance with an eighth aspect, the present invention provides a method for reconstructing a missing frame in a receive frame, the receive frame comprising a frame information as side information indicating a kind of the missing frame of at least two kinds of frames, the method having the steps of: detecting the frame information as side information in the receive frame; and generating a replacement frame for the missing frame in response to the frame information in order to reconstruct the missing frame, a kind of the replacement frame matching the kind of the missing frame.

In accordance with a ninth aspect, the present invention provides a computer program for performing at least one of the above-mentioned methods, when the computer program runs on a computer.

The present invention is based on finding that a rate-distortion optimum rate reduction can be achieved when a decision whether to transmit an information frame or not to transmit the information frame is made upon considering an additional reconstruction distortion resulting at a receiver when the information frame not to be transmitted is, at the receiver, replaced by a replacement frame, for example by a previously transmitted information frame. In other words, the present invention explicitly exploits an information on reconstruction distortion resulting at a receiver after applying a concealment strategy in order to compensate for the frame loss so that e.g. only a certain information frame associated with a smallest reconstruction distortion among a plurality of information frames will not be transmitted in order to achieve the desired rate reduction.

If, for example, an information signal comprising a plurality of information frames is to be transmitted via a communication link which does not support the data rate associated with the information signal, then rate reduction may be performed. In accordance with the present invention, a transmit frame comprising only a sub-set of information frames comprised by the information signal is provided, wherein the information frames not be introduced into the transmit frame are determined upon explicitly exploiting, for each information frame not to be introduced into the transmit frame, a resulting additional reconstruction distortion observed at the receiver when a concealment strategy, e.g. replacing the missing frames by other frames, is performed. In accordance with the present invention, only a certain frame combination will be selected for not being introduced into the transmit signal, which is associated with e.g. a smallest additional reconstruction distortion at a receiver while performing the concealment strategy. In this way, rate reduction associated with e.g. a smallest achievable additional reconstruction distortion can be achieved.

The present invention further provides a concept for joint rate-distortion optimized rate reduction for a plurality of information signals which are, for example, to be transmitted via a common communication link. In accordance with the present invention, a decision which information frames of which information signal should e.g. be dropped or not to be dropped may jointly be made for all information signals upon explicitly exploiting a reconstruction distortion information associated with not transmitting a certain information frame of a certain information signal and replacing the missing information frame by another replacement frame in accordance with a chosen concealment strategy. A dropping pattern for each information signal, the dropping pattern indicating the information frames not to be transmitted is determined such that, in total, a required reduction of data rate associated with a minimum additional reconstruction distortion can be achieved. In other words, for rate reduction, only those information frames will not be transmitted which have the least impact on the perceived quality at the receiver.

The inventive rate-distortion optimized frame dropping strategy can be applied, for example, on active network nodes in case of for example a heavy traffic load. The inventive approach relies for example on a side information that be transmitted along with the bit-stream, for example, along with the video bit-stream. The side information may consist of a rate vector containing the frame size (in bytes) of, for example, every picture as well as distortion values arranged to e.g. a distortion matrix describing the reconstruction distortion, preferably in a mean squared error sense (MSE), observed for a group of pictures given a certain frame loss pattern. In contrast to the quality of service based approaches, the inventive scheme offers larger flexibility and supports dynamic frame importance control. When comparing the inventive rate-distortion optimized dropping concept with priority-based dropping strategies, significantly better reconstruction quality may be observed, which is reflected by, for example, improvements of up to 7 dB.

In addition, the inventive rate-distortion optimized concept for rate reduction enables a dynamic adaptation of the rate to varying transmission characteristics. To do so, additionally, an information on channel state indicating for example an expected frame loss rate associated with an additional distortion can be taken into account for reducing the data rate. When compared to conventional rate adaptation mechanisms, an improved quality for different information signals, for example for different users, can be achieved. Moreover, the proposed rate-optimized rate reduction scheme is easy to implement since, for example, information with respect to reconstruction distortion values are already available at the source. Moreover, a modification of a client software is not required.

A further advantage of the present invention is that transcoding associated with a significant complexity and increased delays is not required. In addition, a simplified transmission scheme over a communication network can be achieved, since, at a routing node of the communication network, a simple dropping strategy can be applied in order to, for example, take different transmission delays or finite buffer sizes for storing the information frames to be forwarded into account. Moreover, a transparent transmission of additional information on reconstruction distortion values for nodes that do not implement the inventive mechanisms can be achieved.

A further advantage of the present invention is that an overall user perceived quality can be achieved by exploiting the fact that, upon explicitly considering a service history, decisions can also be based on knowledge about previous degrading decisions with respect to a rate reduction pattern.

A further advantage of the present invention is that the inventive rate-optimized rate reduction concept is associated with only low implementation complexity and therefore with low costs.

BRIEF DESCRIPTION OF THE DRAWINGS

These and other objects and features of the present invention will become clear from the following description taken in conjunction with the accompanying drawings, in which:

FIG. 6 is the signal characteristics used for determining the performance of the inventive approach.

DESCRIPTION OF PREFERRED EMBODIMENTS

Figure 1:
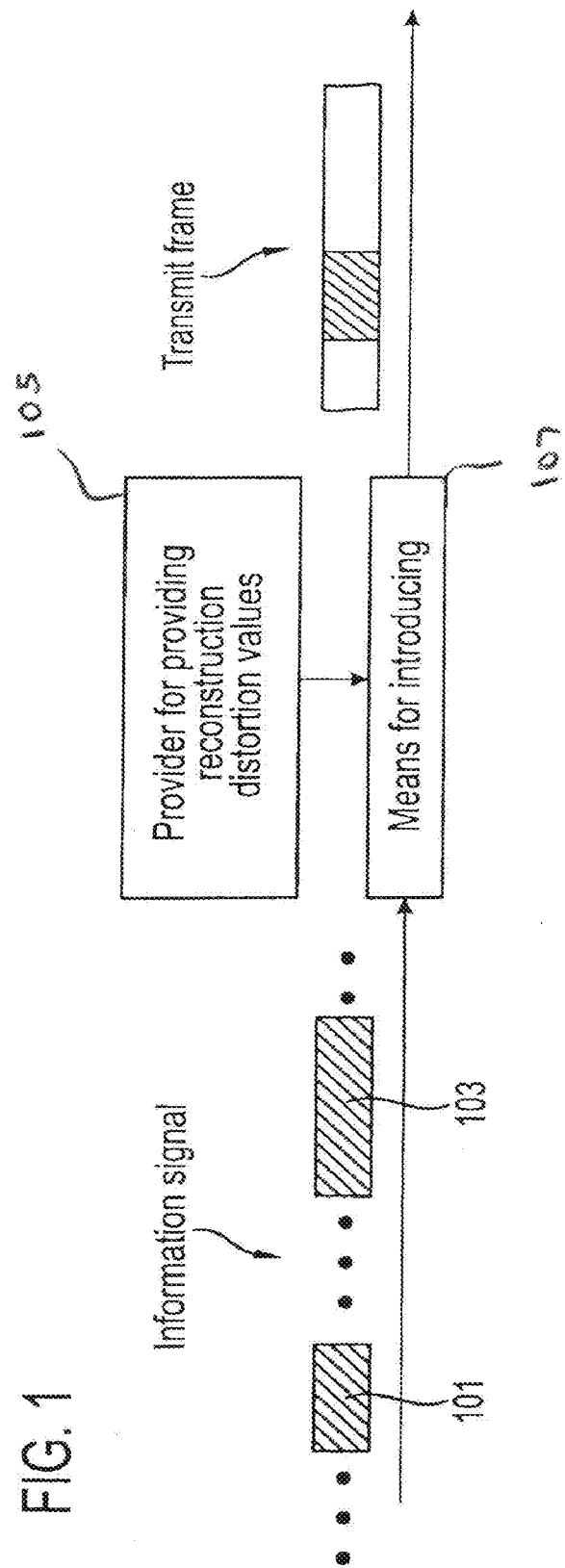
FIG. 1 is a block diagram of an inventive apparatus for generating a transmit frame.
Figure 2:
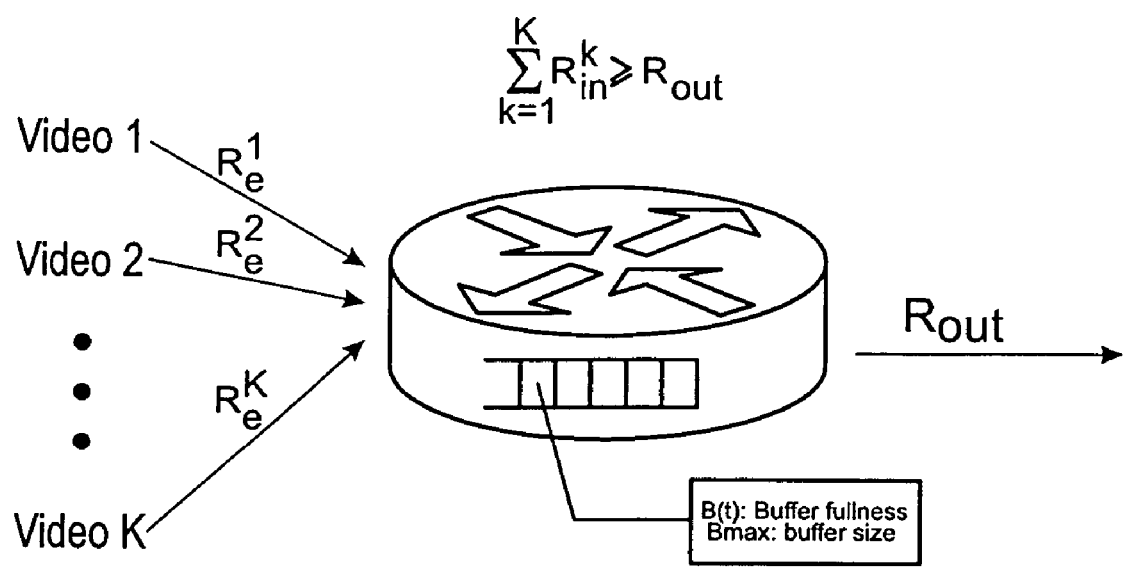
FIG. 2 is an inventive active network node.

FIG. 1 shows a block diagram of an inventive apparatus for generating a transmit frame from an information signal. As is shown in FIG. 1, the information signal comprises a first information frame 101 and a second information frame 103, which are timely arranged, by the way of example only. The apparatus comprises a provider 105 for providing reconstruction distortion values, wherein the provider 105 is coupled to a means 107 for introducing either the first information frame or the second information frame into a transmit frame. The means 107 for introducing comprises an input for receiving the information signal and an output for providing the transmit frame.

Generally speaking, the means 107 for introducing may be configured for introducing N information frames out of M information frames into the transmit frame, wherein M is a number being greater than or equal to N, and wherein M indicates a number of information frames being comprised by the information signal.

The apparatus shown in FIG. 1 is configured for generating the transmit frame from the information signal in a rate-distortion optimized way. To do so, the provider 105 is configured for providing a first reconstruction distortion value indicating a reconstruction distortion when replacing the first information frame by a replacement frame, and for providing a second reconstruction distortion value indicating a reconstruction distortion when replacing the second information frame by a replacement frame. For example, the first reconstruction distortion value indicates a reconstruction distortion when replacing the first information frame by e.g. a preceding information frame received by the receiver. Accordingly, the second reconstruction distortion value may indicate a reconstruction distortion when the second information frame is replaced e.g. by a further preceding information frame received by the receiver.

For achieving rate reduction, the means 107 is configured for introducing either the first information frame or the second information frame into the transmit frame in dependence on the first reconstruction distortion value or in dependence on the second reconstruction distortion value.

Generally speaking, the provider 105 may be configured for providing a plurality of reconstruction distortion values indicating a plurality of reconstruction distortions when replacing any information frame comprised by the information signal by any replacement frame so that, based on the provided reconstruction distortion values, the means 107 for introducing may introduce only a certain sub-set of information frames from the set of information frames comprised by the information signal into the transmit frame, wherein a sub-set of not introduced information frames is associated with a smallest additional reconstruction distortion observed at a receiver when, for example, the missing, i.e. not transmitted, frames are replaced by preceding frames in order to reconstruct the information.

For example, the means 107 for introducing is configured for introducing either the first information frame or the second information frame into the transmit frame in dependence on an optimization goal, wherein the optimization goal may be a joint rate and additional reconstruction distortion reduction. For example, the optimization goal may be a trade-off between rate reduction and the additional reconstruction distortion observed at the receiver upon performing a concealment strategy, for example, upon replacing transmitted frames by other frames.

For example, the information frames, which are not to be introduced into the transmit frame can be dropped. However, the information frames not to be included into the current transmit frame may be pre-stored so that the not included frames may be included into e.g. a following transmit frame at a following time instant in order to reduce an information loss.

In accordance with a further aspect of the present invention, the means 107 for introducing may be configured for determining which information frame of the information signal is not to be introduced into the transmit frame for a rate and additional reconstruction distortion reduction. For example, the means 107 for introducing may be configured for determining a dropping pattern indicating a combination of frames comprised by the information signal and not to be introduced into the transmit frame. Accordingly, the means 107 for introducing may be configured for determining, which information frame of the information signal is to be introduced into the transmit frame for transmission. To do so, the means 107 for introducing may comprise means for determining which information frame is not to be introduced into the transmit frame so that, for example, a rate reduction associated with a minimum additional reconstruction distortion can be achieved.

Generally speaking, the information signal may comprise a plurality of information frames, wherein the provider 105 may be configured providing different reconstruction distortion values indicating different reconstruction distortions when replacing any information frame by any replacement frame. In this case, the means 107 for introducing may be configured for determining a dropping pattern indicating a combination of information frames not to be introduced into the transmit frame for rate and additional reconstruction distortion reduction.

For example, the information signal may further comprise a third information frame, wherein the provider 105 may be configured for providing a third reconstruction distortion value indicating a reconstruction distortion when replacing the third information frame by a replacement frame. Upon considering the third reconstruction distortion value, the means 107 for introducing may be configured for determining which information frame of the information signal is not to be introduced into the transmit frame so that rate and additional reconstruction distortion reduction can be achieved in a rate-distortion optimized way.

In order to determine which information frame of the information signal is not to be introduced into the transmit frame, the means 107 for introducing may be configured for minimizing a cost function so that a rate reduction can be achieved at minimum costs associated with an additional reconstruction distortion resulting when not transmitting the selected information frames and e.g. replacing the not transmitted, selected information frames at a receiver by other information frames.

In accordance with a further aspect of the present invention, the inventive apparatus shown in FIG. 1 may further comprise a selector for selecting frames of the information signal, which frames are to be introduced or not to be introduced into the transmit signal. For example, subsequently selected information frames can directly be introduced into the transmit frame so that, in the transmit frame, an order of appearance of the selected frames in the information signal can be maintained. However, the means 107 for introducing may be configured for re-arranging an order of appearance of the selected information frames in the transmit frame and to arrange the selected frame depending on a frame rate, for example, in a descending or ascending frame rate order. Doing so, e.g. network congestion or the currently available bandwidth can be taken into account.

In accordance with a further aspect of the present invention, the means 107 for introducing may be configured for solving an optimization problem in order to determine, which information frame of the information signal is not to be introduced into the transmit frame or in order to determine, which information frame is to be introduced into the transmit frame. The optimization problem may be set up as a cost function, which is to be minimized in order to determine which information frame of the information signal is not to be introduced into the transmit frame. The cost function may, for example, reflect the additional reconstruction distortion as the additional costs associated with reducing data rate. The cost function, however, may further reflect a combination of rate reduction and the additional increase of the total reconstruction distortion when taking all dropped (or discarded) frames into account.

The means 107 for introducing may be configured for minimizing the cost function in order to determine which information frame of the information signal is not to be introduced into the transmit frame.

In accordance with a further aspect of the present invention, the means 107 for introducing may be configured for referring, for example, to a predetermined combination of frames, in order to determine which frame combination should not be introduced into the transmit signal for a certain data rate reduction associated with a certain reconstruction distortion. The predetermined setting may be, for example, calculated a priori by minimizing any of the cost functions mentioned above. The pre-calculated settings indicating the frame combinations to be dropped may be addressed, for example, in dependence on a required data rate reduction. Therefore, certain combinations of frames or, certain frames, can quickly be determined in order to drop the certain combinations of frames or the certain frames for achieving, for example, a maximum rate reduction at a minimum additional reconstruction distortion when applying a concealment strategy at a receiver.

In accordance with a further aspect of the present invention, the means 107 for introducing may be configured for minimizing a cost function by the means of calculation. For example, the means 107 for introducing may determine all possible combinations of frames to be dropped, to determine the rate reduction and the additional reconstruction distortion associated herewith and to choose a certain combination of frames to be dropped such that the cost function is at its minimum.

For example, the cost function may comprise a difference of a reconstruction distortion value associated with not introducing a certain information frame of the information signal into the transmit frame, and a number of bits saved when not introducing the certain frame. In other words, the cost function may comprise the difference of the reconstruction distortion value when not transmitting the certain information frame after having performed any concealment strategy at the receiver and the reduction of data rate. The means 107 for introducing may be configured in this case for determining the certain information frame such that the cost function is minimum.

In the above-mentioned embodiments, the inventive concept for rate-distortion optimized rate reduction was addressed with respect to a single user scenario or, in other words, with respect to a single information signal containing a plurality of information frames. However, the inventive concept may also be applied to a plurality of information signals associated with, for example, a plurality of users, wherein the plurality of information signals, each of which comprising a plurality of information frames, is to be transmitted via a shared medium, for example, via a common communication link to a remote receiver.

In accordance with a further aspect of the present invention, the inventive apparatus may be further configured for generating a further transmit frame from a further information signal, wherein the further information signal comprises a further first information frame and a further second information frame. In other words, the further information signal may comprise a plurality of frames, as has been discussed with regard to the information signal. Preferably, the means 105 for providing is configured for providing a further first reconstruction distortion value indicating a reconstruction distortion when replacing the further first information frame by a replacement frame, and for providing a further second reconstruction distortion value indicating a reconstruction distortion when replacing the further second information frame by a replacement frame. Accordingly, the means 107 for introducing may be configured for introducing either the further first information frame or the further second information frame into the further transmit frame in dependence on the further first reconstruction distortion value or in dependence on the further second reconstruction distortion value.

In order to determine which information frame of the further information signal is not to be introduced into the further transmit signal for rate and additional reconstruction distortion reduction, the means 107 for introducing may be configured, for example, for referring to the reconstruction distortion values associated with e.g. discarding frames comprised by the further information signal.

Accordingly, the further information signal may comprise a further third information frame, wherein the provider 105 may be configured for providing a further third reconstruction distortion value when replacing the further third information frame by a replacement frame. Generally speaking, the further information signal may comprise a plurality of further information frames, wherein the provider 105 is configured for providing a plurality of further reconstruction distortion values, each further reconstruction distortion value being associated with an additional reconstruction distortion when replacing the associated information frame of the further information signal by another replacement frame at a receiver when applying for example, a concealment strategy relying on frame replacement. For example, the replacement frames may be the previously transmitted frames of the same kind, for example, B-frames or P-frames of a group of pictures. Same considerations apply for the information signal.

Generally speaking, the means 107 for introducing may be configured for determining a combination of information frames (e.g. a dropping pattern) not to be introduced into the further transmit signal for rate and additional reconstruction distortion reduction.

In accordance with the previous descriptions, the means 107 for introducing may be further configured for minimizing a cost function in order to determine which information frame of the further information signal is not to be introduced into the further transmit frame.

Furthermore, the means 107 for introducing may be configured for jointly determining which information frame of the information signal is not to be introduced into the transmit frame, and which information frame of the further information signal is not to be introduced into the further transmit frame for a joint rate and additional reconstruction distortion reduction. In other words, a total rate reduction associated with a total additional instruction distortion reduction is considered. This is, for example, advantageous, when the transmit frame and the further transmit frame are to be transmitted via a common communication link, i.e. via a shared medium. In this case, a bandwidth of the common communication link determines a total available data rate.

In general, a plurality of information signals may jointly be considered in order to determine, for each information signal, a suitable dropping pattern while simultaneously considering fairness among the information signals, e.g. users, with respect to assigned network resources, e.g. bandwidth or transmit power.

If the transmit frame and the further transmit frame are to be transmitted via a common communication link, then the inventive apparatus may comprise a buffer for enqueuing information frames of the information signal and information frames of the further information signal, wherein the means 107 for determining may be configured for determining which information frame of the information signal is not to be introduced into the transmit frame, and which information frame of the further information signal is not to be introduced into the further transmit frame in dependence on a buffer length or in dependence on a buffer fullness.

In accordance with a further aspect of the present invention, the means 107 for introducing may be configured for determining which information frame of the information signal is to be introduced into the transmit frame, and which information frame of the further information signal is to be introduced into the further information frame by minimizing a cost function.

The cost function may comprise for example a difference of a first sum of a reconstruction distortion value associated with not introducing a certain frame of the information signal into the transmit frame and a reconstruction distortion value associated with not introducing a certain frame of the further information signal into the further frame, and of a second sum of a number of bits saved when not introducing the certain frame of the information signal into the transmit frame and a number of bits saved when not introducing the certain frame of the further information signal into the further transmit frame. In other words, the first sum comprises a sum of reconstruction distortion values associated with replacing information frames not to be transmitted by replacement frames, and the second sum comprises a total number of bits or bytes saved when not transmitting the information frames. The means 107 for introducing is then configured for determining the certain frame of the information signal and the certain frame of the further information signal such that the cost function is minimum. This issue will be discussed later in detail.

In accordance with a further aspect of the present invention, the means 107 for introducing may further be configured for setting up the cost function. For example, the means 107 for introducing may be configured for determining the sums and/or the difference of the sums mentioned above.

For minimizing the cost function, which can be a Lagrangian cost function, the apparatus may further comprise an optimizer in order to determine which information frame is not to be introduced into the transmit frame or in order to determine which further information frame is not to be introduced into the further transmit frame.

In accordance with a further aspect of the present invention, the means 107 for introducing may be further configured for introducing a frame information, e.g. a side information, into the transmit frame, the frame information indicating a kind of the information frame not to be introduced into the transmit frame. For example, the frame information indicates, for the case of a video signal, whether an I-frame, or a B-frame or a P-frame has not been introduced into the transmit frame.

In order to provide the reconstruction distortion values to the means 107 for introducing, the provider 105 may be configured for receiving same, e.g. for receiving the first reconstruction distortion value or the second reconstruction distortion value from a remote transmitter when the remote transmitter is configured for transmitting the reconstruction distortion values or information indicating the reconstruction distortion values over a communication network.

However, the provider 105 may be configured for estimating the first reconstruction distortion value or the second reconstruction distortion value from a kind of information being comprised by the first information frame or by the second information frame of the information signal. In this context, the term "kind of the information frame" refers to a kind of information comprised by the information frame. For example, in the case of a video signal or in the case of pictures, the information indicating the kind of information refers to e.g. a type of the video frame. The same considerations apply for the case of the further information signal, or, generally, for a plurality of information signals, each information signal comprising a plurality of information frames.

In addition, the provider 105 may be configured for providing a plurality of reconstruction distortion values, each of which indicating a reconstruction distortion when replacing the first information frame by a different replacement frame, and for providing a plurality of reconstruction distortion values, each of which indicating a reconstruction distortion when replacing the second information frame by a different replacement frame. In other words, the provider 105 may be configured for determining reconstruction distortion values when replacing e.g. a certain information frame by all possible replacement frames.

In accordance with a further aspect of the present invention, the provider 105 may be configured for determining the reconstruction distortion values. For example, the provider 105 may be configured for emulating a concealment strategy, e.g. frame replacement, applied at a receiver. The provider 105 may be configured for replacing the frames to be dropped by certain replacement frames, for example, by previously transmitted frames of the same kind, and for decoding the resulting information signal comprising replacement frames in order to determine the reconstruction distortion. For example, the decoding scheme applied for determining the reconstruction distortion may be a source decoding scheme applied at a receiver. Additionally, the provider 105 may decode the original information signal and compare a decoded origin information signal with the resulting decoded information signal after applying a concealment strategy in order to determine the reconstruction distortion values.

The present invention further provides an apparatus for generating a transmit signal from an information signal, wherein the information signal comprises an information frame, as has been described above.

The inventive apparatus may comprise a provider for providing a reconstruction distortion value indicating a reconstruction distortion when replacing the information frame by a replacement frame. For example, the apparatus for generating the transmit signal may comprise the above-described provider.

In addition, the inventive apparatus may comprise a combiner for combining the information signal and the reconstruction distortion value in order to obtain the transmit signal.

The provider may further comprise means for determining the reconstruction distortion value, wherein the means for determining may be configured for determining a further reconstruction distortion value when replacing the information frame by a further replacement frame.

In addition, the means for determining may be configured for determining a MSE distortion value in order to determine the reconstruction distortion value.

For example, the means for determining may be configured for determining the reconstruction distortion value resulting when replacing the information frame by a preceding information frame.

In accordance with a further aspect of the present invention, the means for determining may be configured for decoding a test signal obtained from the information signal by replacing the information frame by the replacement frame in order to determine the reconstruction distortion value. If, for example, the information signal results from source coding an origin signal, then the means for determining may be configured for source decoding the test signal and comparing a source decoded test signal with the origin signal in order to determine the reconstruction distortion value.

It is to be noted that the functionalities of the means for determining comprised by the apparatus for generating the transmit signal may also be comprised by the means for determining comprised by the means for introducing described above.

In addition, the apparatus for generating the transmit signal may comprise a source coder for source coding the origin signal in order to obtain the information signal, wherein the source coder is configured for determining the reconstruction distortion value associated with a concealment strategy, e.g. frame replacement.

In addition, the combiner may be configured for attaching the reconstruction distortion values to the information frame in order to obtain the transmit signal.

The apparatus may further be configured for generating a further transmit signal from a further information signal, the information signal comprising a further information frame, wherein the provider may be configured for providing a reconstruction distortion value resulting when replacing the further information frame by a replacement frame. Moreover, the combiner may be configured for combining the further information signal and the reconstruction distortion value to obtain a further transmit signal.

For communicating, the apparatus may further comprise a transmitter for transmitting the transmit signal or for transmitting the further transmit signal.

The present invention further provides a communication network node comprising a receiver for receiving an information signal, the apparatus for generating a transmit frame from the information signal as has been described above and means for generating a transmit signal on a basis of the transmit frame.

The means for generating the transmit signal may be configured for attaching a frame information, e.g. a side information to the transmit frame in order to obtain the transmit signal. The frame information may indicate a kind of the information frame not being introduced into the transmit signal, as has been described above. For example, the frame information may be used by a remote receiver for reconstructing the information frame which is missing by replacing the missing frame by a replacement frame of the same kind, e.g. by an information frame comprising the same type of information.

In addition, the means for generating the transmit signal may be configured for attaching a reconstruction distortion value to the transmit frame in order to obtain the transmit signal. The reconstruction distortion value may indicate a reconstruction distortion when replacing an information frame by a replacement frame, as has been described above.

A reconstruction distortion value may be transmittable from a remote transmitter over, e.g., a communication network. In this case, the receiver may be configured for receiving the reconstruction distortion value or for detecting same in a signal received from the remote transmitter.

Additionally, the receiver may be configured for receiving a further information signal, for example in a multi user transmission scenario. In this case, the apparatus for generating the transmit frame may be configured for generating a further transmit frame from the further information signal, as has been described above. In this case, the means for generating may be configured for generating a further transmit signal on a basis of the further transmit frame.

In addition, the means for generating may be configured for attaching the frame information to the transmit frame in order to obtain the transmit signal, the frame information indicating a kind of the information frame not being introduced into the transmit frame. Accordingly, the means for generating may be configured for attaching a reconstruction distortion value to the further transmit frame in order to obtain the further transmit signal, the reconstruction distortion value indicating a reconstruction distortion when replacing an information frame by a replacement frame.

In accordance with a further aspect of the present invention, the means for generating may be configured for generating a composite transmit signal comprising the transmit signal and the further transmit signal timely following the transmit signal. For example, the means for generating is configured for arranging the further transmit signal after the transmit signal within a signal frame to be transmitted.

Moreover, the apparatus may comprise a transmitter for transmitting the transmit signal or the transmit frame or the signal frame.

The transmitter may be a wireless or a wired transmitter. For example, in the case of wireless transmission, the transmitter may incorporate transmitter functionalities of any WLAN system, e.g. channel coding, modulating, etc. Accordingly, the inventive receivers are configured for receiving transmitted signals, demodulating and decoding same by applying, for example, any channel decoding scheme.

In addition, the present invention provides an apparatus for reconstructing a missing frame in a receive frame, the receive frame comprising a frame information, e.g. a side information, indicating a kind of the missing frame of at least two kinds of frames, as has been described above. For example, the frame information comprises an information on a B-frame or on a P-frame, which is not included in a receivable version of a video signal comprising group of pictures.

The apparatus for reconstructing the missing frame may comprise means for detecting the frame information the receive frame and means for generating a replacement frame for the missing frame in response to the frame information in order to reconstruct the missing frame, wherein a kind of the replacement frame is preferably matching the kind of the missing frame. For example, the frame information indicates that a B-frame is missing. In this case, the means for generating may be configured for replacing the missing B-frame by a previously received B-frame or by a previously received I-frame, which is a concealment strategy in this case.

In the following, further embodiments of the present invention will be described with respect to FIGS. 3-8.

We consider a scenario where K video streams arrive at an active network node and leave the node on the same outgoing link. An active network node is an entity that has to forward incoming data streams to one or more outgoing links (wireless or wired) and has more computational resources than those required for just forwarding the packets. Examples are programmable or active routers, the base station of a cellular network, or the cable head-end of a cable network.

The inventive frame dropping strategy relies an side information that is sent along with the video bit-streams. We assume in the following that the video is organized in Group of Pictures (GoP) and the active network nodes know the frame structure of a GoP. This information can either be signaled along with the bit-stream or can be inferred from previous GoPs. The GoP structure of video k is described by the GoP length $L^k$ and the number of B-frames $B^k$ in between two I- or P-frames. As an example let's consider $L^k=9$ and $B^k=2$ which leads to the GoP structure $IB_1B_2P_1B_3B_4P_2B_5B_6$. The rate vector consists of the frame size of every frame in the GoP. The frame size of frame n in video k is denoted as $R_e^k(n)$ and can be extracted during the encoding process at the sender. The mean encoding rate is therefore given as the average of $R_e^k(n)$ over the entire video sequence of length $N^k$ $$R_e^k \frac{f^k}{N_k} \sum_{n=1}^{N_k} R_e^k(n) \qquad (1)$$

with $f^k$ the frame rate of video k. The distortion matrix consists of the reconstruction distortion values observed when replacing a lost frame by a preceding frame. The reconstruction distortion of frame n of video k is given as $D^k(n)$. The mean distortion at the decoder therefore is given as $$D^k = \frac{1}{N_k} \sum_{n=1}^{N_k} D^k(n) \qquad (2)$$

If every video frame is received correctly the frame distortion $D^k(n)$ corresponds to the encoding distortion $D_e^k(n)$ which is caused by the quantization step at the encoder. In case frames are missing for decoding the frame distortion will be larger than the encoding distortion. It is assumed that in case of frame loss, the decoder applies a concealment strategy where the most recent decoded frame is displayed instead of the lost frame. All frames depending an a lost frame are considered to be lost as well. The distortion matrix contains all distortion values that are necessary to infer the expected distortion at the decoder in case of a frame drop given the aforementioned concealment strategy.

The following example shows a distortion matrix for a GoP with $L^k=9$ and $B^k=2$.

$$\begin{matrix} R: \\ I: \\ P_1: \\ P_2: \\ B_1: \\ B_3: \\ B_5: \end{matrix} \begin{bmatrix} D_I^R & D_{B_1}^R & D_{B_2}^R & D_{P_1}^R & D_{B_3}^R & D_{B_4}^R & D_{P_2}^R & D_{B_5}^R & D_{B_6}^R \\ / & D_{B_1}^I & D_{B_2}^I & D_{P_1}^I & D_{B_3}^I & D_{B_4}^I & D_{P_2}^I & D_{B_5}^I & D_{B_6}^I \\ / & / & / & / & D_{B_3}^{P_1} & D_{B_4}^{P_1} & D_{P_2}^{P_1} & D_{B_5}^{P_1} & D_{B_6}^{P_1} \\ / & / & / & / & / & / & / & D_{B_5}^{P_2} & D_{B_6}^{P_2} \\ / & / & D_{B_2}^{B_1} & / & / & / & / & / & / \\ / & / & / & / & / & D_{B_4}^{B_3} & / & / & / \\ / & / & / & / & / & / & / & / & D_{B_6}^{B_5} \end{bmatrix} \qquad (3)$$

The entries in the distortion matrix $D_{F_{loss}}^{F^{rep}}$ are the MSE values observed when replacing frame $F_{loss}$ by $F_{rep}$ as part of the concealment strategy. The column left to the distortion matrix shows the replacement frame $F_{rep}$ for every row of the matrix. For instance, $D_{B_1}^I$ represents the additional reconstruction distortion if the first B-frame of the GoP is lost and therefore replaced by the I-frame of that GoP. R is a frame from the previous GoP that is used as a replacement for all frames in the current GoP if the I-frame of the current GoP is lost. From this matrix the resulting distortion for any possible loss pattern can be determined. The total distortion for the GoP is computed as the sum of the individual frame loss distortions. This matrix can be determined during the encoding of the video. The B-frames $B_2$, $B_4$, and $B_6$ will never be used as a replacement frame for any other frame in the GoP and therefore do not show up in the distortion matrix. The number of columns of the distortion matrix corresponds to the GoP length $L^k$. The number of relevant entries into the distortion matrix can be determined as $$L^k + (L^k - 1) + \sum_{i=0}^{\frac{L^k}{B_k+1}-1} (B^k + i(B^k + 1)) \quad (4)$$

which can be simplified to $$\frac{1}{2}L^k\left(3 + \frac{L^k}{B^k + 1}\right) \quad (5)$$

As mentioned before the scenario is considered where K video streams arrive at an active network node and leave the node on the same outgoing link. This outgoing link has a transmission rate $R_{out}$. The outgoing link has a link buffer of size $B_{max}$ and the current buffer fullness is denoted as $B(t)$. The dropping strategy is based on the current buffer fullness. If the buffer is empty, no frames should be dropped. When the buffer fills up, those frames should be dropped that have the least impact on the perceived quality at the receiver. The decision which frames to drop has to be jointly made for all video streams. Given the rate vector and the distortion matrix described above, the active network node can perform rate-distortion optimized frame dropping. For this, the node determines how full the buffer currently is and minimizes a Lagrangian cost function that determines the optimum dropping pattern $$J_P(n) = \sum_{k=1}^{K} \Delta D_P^k(n) - \lambda(n) \sum_{k=1}^{K} \Delta R_P^k(n) \quad (6)$$

where $\Delta D_p^k(n)$ is the additional distortion introduced in video k for dropping pattern p and $\Delta R_p^k(n)$ is the number of Bytes saved for dropping pattern p. For simplicity continuous time t by the frame index n of the video sequences is replaced, which means that dropping decisions will only be made at multiples of the frame duration, by the way of example only.

If the current frame that arrives at the active node is an I-frame, we can either drop this frame or send it to the outgoing link. If we drop it, this means that all following P- and B-frames cannot be decoded and have to be dropped also. This dropping strategy leads to a significant increase in distortion for this GoP but at the same time allows us to reduce the sending rate to 0 for this GoP. If we do not drop the I-frame at time n we can still decide to drop all following P-frames. This will lead to reduced distortion but also the rate saving will be smaller. If we decide not to drop the following P-frames we could decide to drop all B-frames. Again, the additional distortion will be reduced but also the rate saving will be small. So if the current incoming frame is an I-frame, there is a total of 4 dropping choices {I,P,B,N}, where N stands for drop nothing. If the current frame is a P-frame, the choices are reduced to {P,B,N}. If the current frame is a B-frame the choices are also {P,B,N}. Please note that in this case the P stands for the next P-frame that is transmitted after the current B-frame. One could imagine other dropping patterns for the B-frames. As the rate saving, however, is typically very small when dropping single B-frames, we assume in the following that dropping B-frames always means dropping this B-frame and all following B-frames in the same GoP. Similarly, dropping P-frames always means dropping all P- and B-frames up to the next I-frame. Dropping I-frames results in dropping the entire GoP. If we denote the set of possible dropping patterns at time n for video k as $A^k(n)$ then for K videos we get $$P(n) = \prod_{k=1}^{K} A^k(n)$$

different dropping patterns. One of the dropping patterns will minimize (6). This pattern represents the optimum dropping strategy at time n. In order to perform this minimization we have to determine a reasonable value for the Lagrangian multiplier $\lambda(n)$ in (6).

Figure 3A:
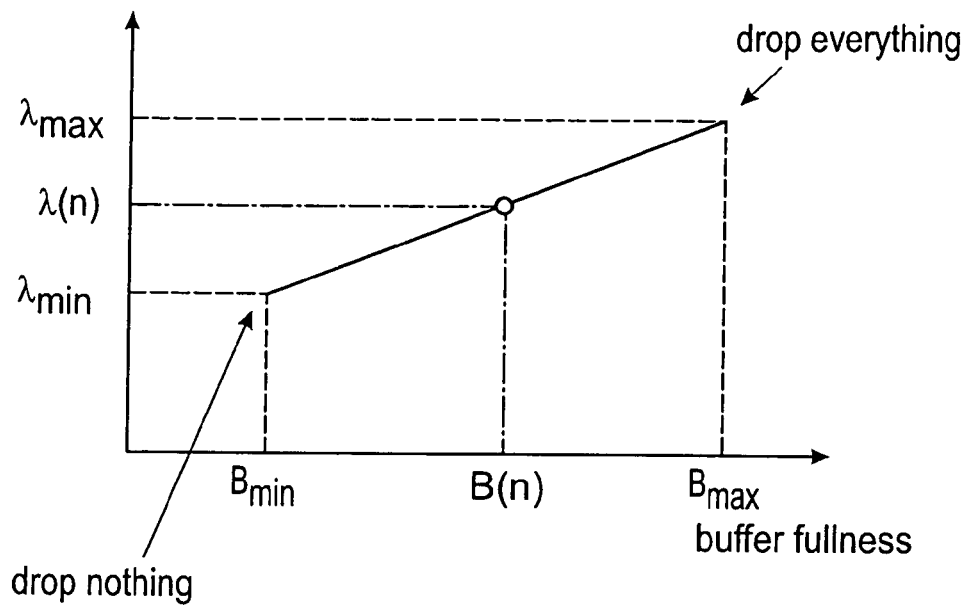
FIG. 3a is an inventive interpolation of a Lagrangian multiplier.

In accordance with the present invention, we determine $\lambda(n)$ as a function of buffer fullness $B(n)$. If the buffer is empty, we certainly do not want to drop any video frames. This has to be reflected by an appropriate choice of $\lambda(n)$ If the buffer is full, $\lambda(n)$ should be selected such that all possible frames are dropped as the enqueuing of these frames in the outlink buffer would fail anyway. In order to determine appropriate values for $\lambda(n)$ at any buffer level, we define a minimum buffer fullness $B_{min}$ below which no dropping should happen. The values for $\lambda(n)$ between $B_{min}$ and $B_{max}$ are obtained by linearly interpolating between $\lambda_{min}(n)$ and $\lambda_{max}(n)$. FIG. 3a, demonstrating linear interpolation between $\lambda_{min}(n)$ and $\lambda_{max}(n)$ as a function of the current buffer fullness $B(n)$ and we obtain $$\lambda(n) = \frac{B_{max} - B(n)}{B_{max} - B_{min}} \lambda_{min}(n) + \frac{B(n) - B_{min}}{B_{max} - B_{min}} \lambda_{max}(n) \quad (7)$$

Figure 3B:
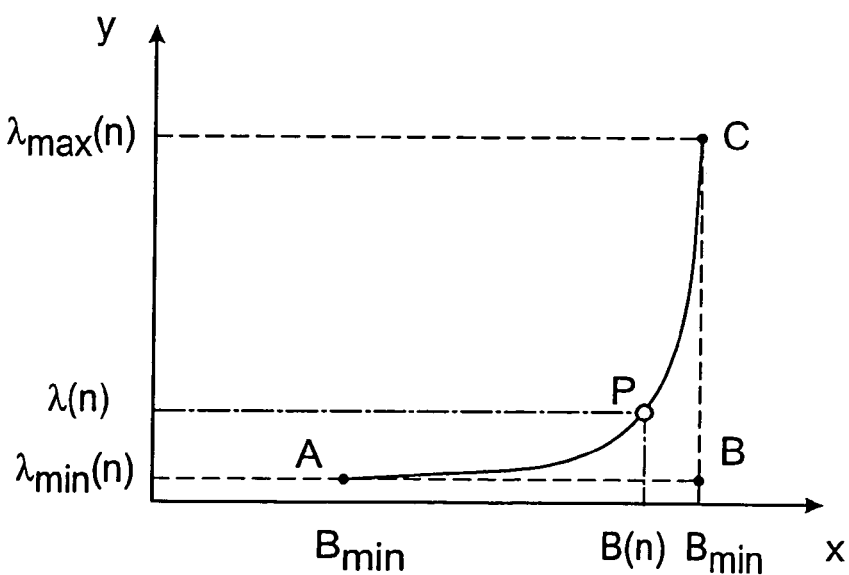
FIG. 3b is an inventive interpolation of a Lagrangian multiplier.

Linear interpolation is the simplest way to interpolate $\lambda(n)$. An interpolation function that leads to more aggressive dropping if the buffer fullness comes close to $B_{max}$ can be realized by quadratic interpolation of $\lambda(n)$, as depicted in FIG. 3b showing quadratic interpolation of $\lambda(n)$ between $\lambda_{min}(n)$ and $\lambda_{max}(n)$ for the current buffer level $B(n)$.

With three control points A, B, and C, we can define a quadratic Bézier curve for $\lambda(n)$ with $$A=(A_x, A_y)=(B_{min}, \lambda_{min}(n))$$

$$B=(B_x, B_y)=(B_{max}, \lambda_{min}(n))$$

$$C=(C_x, C_y)=(B_{max}, \lambda_{max}(n))$$

$$P_x=(1-t)^2 A_x+2t(1-t) B_x+t^2 C_x \quad (7a)$$

$$P_y=(1-t)^2 A_y+2t(1-t) B_y+t^2 C_y \quad (7b)$$

The interpolated point $P=(P_x, P_y)$ moves on this curve from A to C by varying the parameter t from 0 to 1. For a given $B(n)$, we determine t and then $\lambda(n)=P_y$ from (7a) and (7b).

In order to determine $\lambda_{min}(n)$ we evaluate (6) for every dropping pattern and select $\lambda_{min}(n)$ such that the minimum of (6) is obtained for the dropping pattern where nothing is dropped in all K video streams. This means that $$J_{p_n} = \sum_{k=1}^{K} \Delta D_{p_n}^k(n) - \lambda_{\min}(n) \sum_{k=1}^{K} \Delta R_{p_n}^k(n) \leq \qquad (8)$$

$$\sum_{k=1}^{K} \Delta D_p^k(n) - \lambda_{\min}(n) \sum_{k=1}^{K} \Delta R_p^k(n)$$

$$J_{p_n} = \sum_{k=1}^{K} \Delta D_{p_n}^k(n) - \lambda_{\min}(n) \sum_{k=1}^{K} \Delta R_{p_n}^k(n)$$

$$\leq \sum_{k=1}^{K} \Delta D_p^k(n) - \lambda_{\min}(n) \sum_{k=1}^{K} \Delta R_p^k(n)$$

for $p = 1 \ldots P$ and $p \neq p_n$ with $p_n$ representing the pattern where no frame drop occurs in all video streams. As $J_{p_n}(n)$ equals zero, this leads to $$\lambda_{\min}(n) \leq \frac{\sum_{k=1}^{K} \Delta D_p^k(n)}{\sum_{k=1}^{K} \Delta R_p^k(n)} \quad \text{for } p = 1 \ldots P \text{ and } p \neq p_n \qquad (9)$$

and we pick $\lambda_{min}(n)$ to be as big as possible while still satisfying all the inequalities in (9). The value for $\lambda_{max}(n)$ is derived in a very similar fashion. For this, the minimization of (6) should now lead to the decision of dropping as many frames as possible (dropping pattern $p_a$) which leads to $$J_{p_a}(n) = \sum_{k=1}^{K} \Delta D_{p_a}^k(n) - \lambda_{\max}(n) \sum_{k=1}^{K} \Delta R_{p_a}^k(n) \qquad (10)$$

$$\leq \sum_{k=1}^{K} \Delta D_p^k(n) - \lambda_{\max}(n) \sum_{k=1}^{K} \Delta R_p^k(n)$$

for $p = 1 \ldots P$ and $p \neq p_a$

This leads to $$\lambda_{\max}(n) \geq \frac{\sum_{k=1}^{K} (\Delta D_{p_a}^k(n) - \Delta D_p^k(n))}{\sum_{k=1}^{K} (\Delta R_{p_a}^k(n) - \Delta R_p^k(n))} \qquad (11)$$

for $p = 1 \ldots P$ and $p \neq p_a$ and we pick $\lambda_{max}(n)$ to be as small as possible while still satisfying all inequalities in (11).

We investigate how much improvement on the average reconstruction quality can be achieved by using the proposed RD optimized dropping strategy when compared to priority-based dropping. In the simulations we assume that four video streams that have been encoded with the emerging H.264 codec arrive at an active network node and have to be sent out on the same outgoing link. FIG. 6 summarizes the main characteristics of the four videos.

The combined average rate of the four videos is 290 kbps. The actual rate at a certain time instant varies significantly because of the different frame types and the varying activity in the sequences. The GoP length of the four videos is $L_1=18$, $L_2=22$, $L_3=26$, and $L_4=24$ frames, respectively. The GoP structure for all videos is IBPBP . . . which corresponds to $B^k=1$. The size of the outlink buffer is set to be 32 KByte. The simulations are performed for a video session length of 3000 frames. For this, the video sequences are continuously repeated. The simulation time is incremented in multiples of the frame period. This means that every frame period 4 new frames, each from one video, arrive at the network node for forwarding and a dropping decision is made.

The outlink buffer behaves in both cases (RD optimized dropping and priority-based dropping) in exactly the same way. If a video frame is to be sent on the outgoing link it is first placed in the output buffer. In case the buffer is too full to accommodate the frame it is dropped. If more than one frame is sent to the outlink buffer at the same time, we assume that the packets are labelled according to their content (I-, B-, or P-frame). If the buffer cannot accommodate all frames it will always first drop the B-frames. If the buffer is still not empty enough for the remaining frames, P-frames are dropped next and in the same spirit, eventually the I-frames are dropped. This dropping mechanism corresponds to the priority-based dropping strategy used for comparison.

For the RD optimized dropping strategy the same outlink buffer is used but the active network node decides beforehand which frames to send to the buffer. Those frames that are decided to be dropped by minimization of (6) are not passed on to the buffer. Despite the optimization it might still happen that more data is passed to the buffer than can be accommodated which leads to additional loss of data. It is therefore possible that sometimes random dropping also happens after an optimized dropping pattern has been determined.

In the experiments, we use the I-frame of the previous GOP as the replacement frame R in (3) during our dropping decision. When measuring reconstruction distortion at the receiver, however, we use the most recent successfully decoded frame as a replacement for a dropped frame, by the way of example only.

Figure 4A:
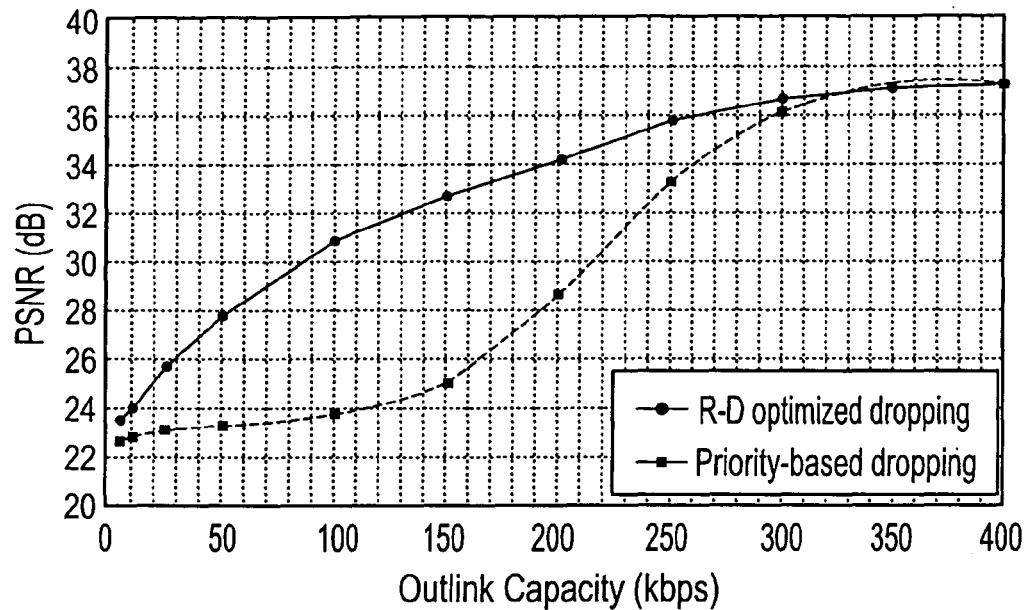
FIG. 4a is a performance of the inventive approach.

FIG. 4a shows the improvements obtained by the RD-optimized video frame dropping concept proposed in this paper. The PSNR values are averaged over the 4 video sequences. When the outgoing bit-rate $R_{out}$ is larger than the incoming rate (290 kbps), the RD-optimized dropping and the priority-based dropping perform similar. This is expected as in this case the buffer will very rarely overflow and only very few frames are lost in both cases. If, however, the outgoing rate is smaller than the total average rate of the 4 videos, it can be seen that the RD-optimized dropping leads to huge improvements in terms of reconstructed video quality. If we select the outgoing link rate to be $R_{out}=150$ kbps we see an improvement of about 7.5 dB.

Only if the buffer level is larger than $B_{min}$, the RD-optimized dropping strategy will start dropping video frames.

Our RD-optimized dropping approach (RDOD) with linear and quadratic interpolation for the Lagrangian multiplier has already been introduced. In the simulation, we further compare RDOD with priority-based random dropping (PRD). The working principle of PRD has been introduced above. Compared to traditional PRD, a performance improvement can be expected if the priority-based dropping is started before the buffer is 100% full. Dropping some B frames earlier when the buffer load exceeds a present threshold $B_1$ and dropping some P frames when it exceeds threshold $B_2$ makes the prioritization of I versus B and P frames even stronger. We call this approach priority-based early random dropping (PRED). In the simulation, threshold $B_1$ and threshold $B_2$ are set to be 70% and 90% of $B_{max}$.

Figure 4B:
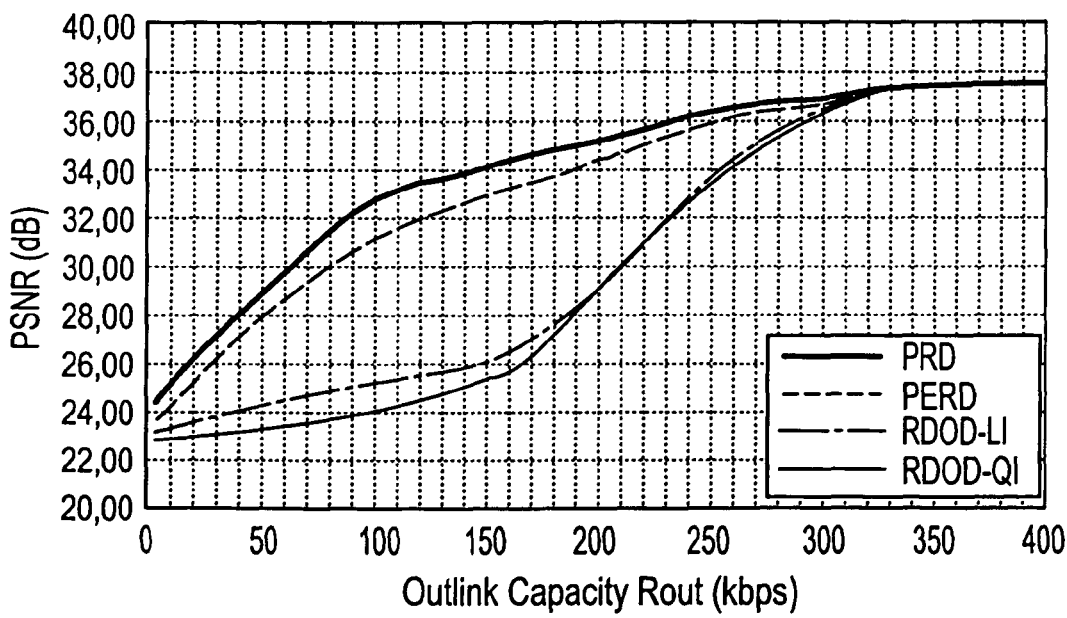
FIG. 4b is a performance of the inventive approach.

FIG. 4b shows video reconstruction quality vs. outlink rate wherein the inventive improvement obtained by the RD-optimized video frame dropping concept is demonstrated. The PSNR values are averaged over the 4 video sequences. When the outgoing bit-rate $R_{out}$ is larger than the mean incoming rate (290 kbps), the RD-optimized dropping and the priority-based dropping perform similar. This is expected as in this case the buffer will very rarely overflow and only very few frames are lost in both cases. If, however, the outgoing rate is smaller than the total average rate of the 4 videos, it can be seen that the RD optimized dropping leads to huge improvements in terms of reconstructed video quality. Quadratic interpolation (RDOD_QI) of $\lambda(n)$ leads to a better performance than linear interpolation (RDOD_L1). If we select the outgoing link rate to be $R_{out}$=150 kbps, we see an improvement of about 8 dB between the RDOD_QI and PERD.

The computation of $\lambda(n)$ depends on $\lambda_{min}(n)$ and $\lambda_{max}(n)$ and therefore on the selection of $B_{min}$. FIG. 4a shows the reconstructed video quality as a function of $B_{min}$. It can be observed that $B_{min}$ has little influence on the reconstruction quality as long as we select it to be small enough. The outgoing rates for the simulation in FIG. 4a are 200 kbps and 250 kbps.

Figure 5A:
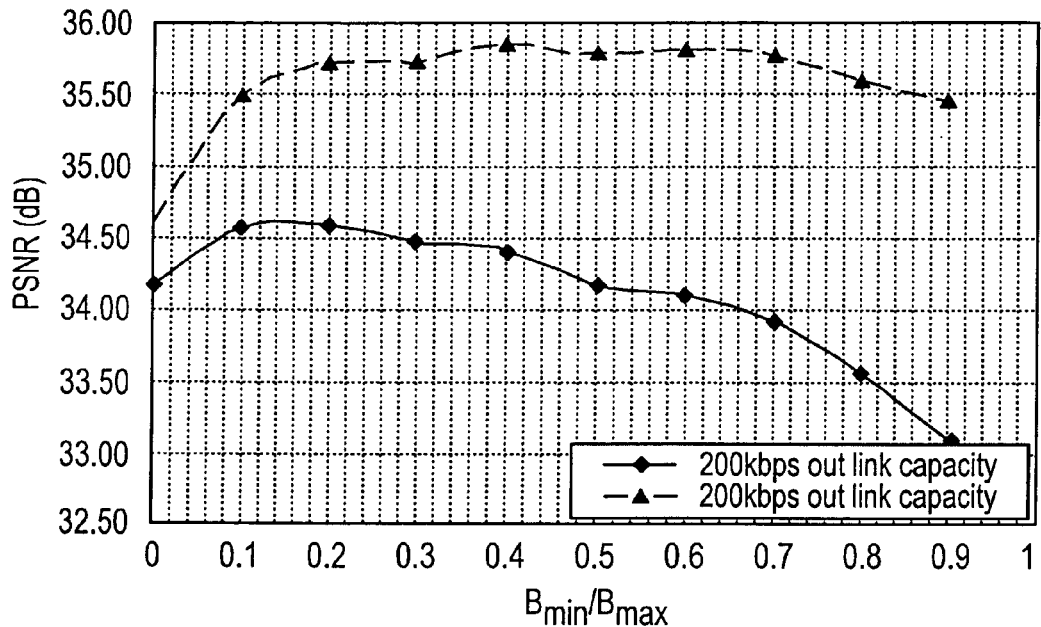
FIG. 5a is a performance of the inventive approach.

Preferably, only if the buffer level is larger than $B_{min}$, the RD-optimized dropping strategy will start dropping video frames. Here we assume that $B_{max}$ always corresponds to 100% fullness. As mentioned above, the computation of $\lambda(n)$ depends on $\lambda_{min}(n)$ and $\lambda_{max}(n)$ and therefore on the selection of $B_{min}$. FIG. 4b shows the reconstructed video quality as a function of $B_{min}$ for RDOD_QI. It can be observed that $B_{min}$ has little influence on the reconstruction quality as long as we select it to be small enough. The outgoing rates for the simulation in FIG. 5a are 200 kbps and 250 kbps.

As described above, $\lambda(n)$ may be re-computed every time new incoming data becomes available. When we use RDOP_QI, we observe that $\lambda(n)$ changes little as long as the buffer fullness $B(n)$ is smaller than $B_{max}$. In order to reduce computational complexity, we consider calculating $\lambda(n)$ once and use this $\lambda(n)$ for the following m frames before we refresh the value of $\lambda(n)$.

For example, $\lambda(n)$ may be determined for every n-th time instant associated with every n-th frame, and used e.g. for the subsequent n-1 frames. Therefore, a complexity reduction can be achieved since $\lambda(n)$ may be determined not for all frames but for every n-th frame. Moreover, $\lambda(n)$ may be determined only when e.g. the (transmittable and receivable) reconstruction distortion values change significantly which leads to a further complexity reduction. In addition, a rate of calculating $\lambda(n)$ can adaptively be reduced. For example, at a beginning of transmission, $\lambda(n)$ may be determined for every frame. Subsequently, e.g. a resulting error may be determined when calculating $\lambda(n)$ e.g. every n-th, for example every second or third frame. If the resulting error. is acceptable, then it is sufficient to compute $\lambda(n)$ every n-th frame, wherein n can adaptively (step-wise) be determined. Therefore, a trade-off between accuracy and complexity can be achieved. In addition, $\lambda(n)$ may be determined only when a number information signals, e.g. video streams, changes which leads to a further complexity reduction.

Figure 5B:
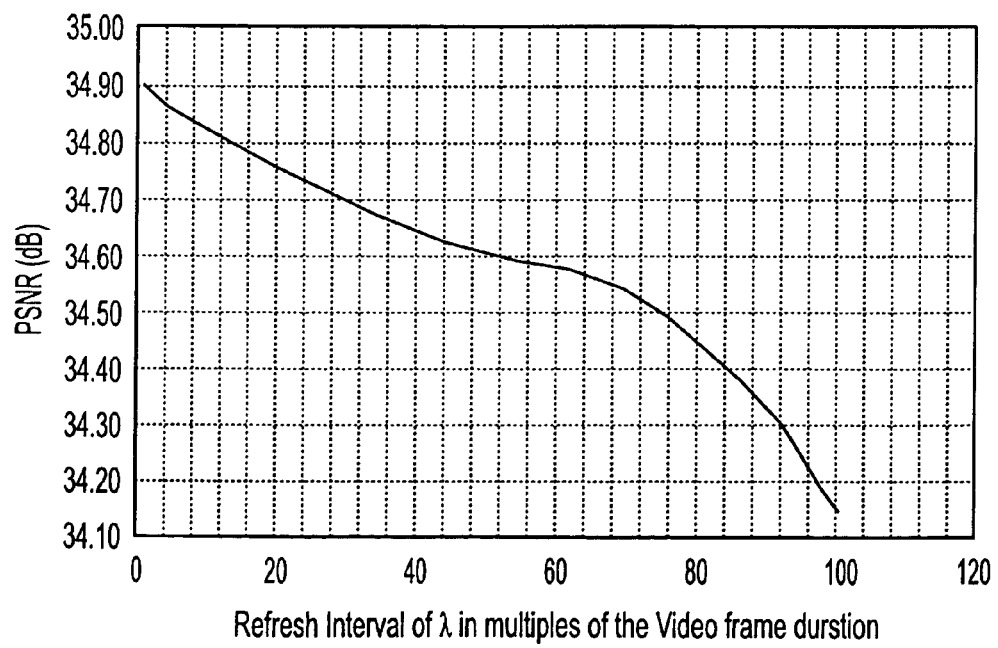
FIG. 5b is a performance of the inventive approach.

FIG. 5b shows an average video reconstruction quality as a function of the refresh interval of $\lambda$. As shown in FIG. 5b, only 0.3 dB quality decrease is observed when repeating $\lambda(n)$ for around 50 video frames.

The inventive RD-optimized video frame dropping strategy may also be applied on active network nodes. The RD-optimization uses the rate vector and the distortion matrix to determine which frames should be dropped in case of heavy network load. The rate vector and the distortion matrix are sent as side information along with each GoP of the video. The only information extracted from the network node itself is the buffer fullness level. Significant quality improvements can be achieved when comparing the inventive scheme to priority-based dropping.

This invention comprises a system and a method that realizes a rate-distortion optimized video frame dropping strategy that can be applied on active network nodes in case of heavy traffic load. The inventive approach relies on side information that is sent along with the video bit-streams.

The side information consists of a rate vector containing the frame size (in bytes) of every picture as well as a distortion matrix describing the reconstruction distortion (in MSE) observed for a Group of Pictures given a certain frame loss pattern. This side information can be used by active network nodes to dynamically decide in a rate-distortion (RD) optimized way, which frames of which video stream should be dropped in case of node overload.

We propose a Lagrangian cost function that uses the rate vector and the distortion matrix together with the current buffer fullness level to find the optimum dropping pattern.

For a simpler setup, only parts of the distortion matrix can be transmitted. For example, the first line of the matrix contains the distortion values referring to one reference picture (R) of the previous Group of Pictures, which is in some cases already a sufficient information for an optimization.

The position of the reference picture R in a GoP can be chosen by the encoder to reflect any anticipated quality of the transmission path. This is important for the dropping decision finding for the I-frame, which depends on the distortion compared to the last original picture in the previous GoP. I.e., in bad conditions (assuming high percentage of droppings) R should refer to the I-frame of the previous GoP, in normal conditions R should represent the middle P-frame. If very good conditions are expected, R should be the last frame of the previous GoP.

Frame dropping decisions that have been performed on preceding network elements can be observed from the incoming packets. They limit the degrees of freedom for frame dropping on the current network node and reduce the complexity of decision making.

In addition, within one node the decisions performed within one GoP should be stored. This simplifies the decision finding for next frames in the same GoP, i.e., the number of degrees of freedom are reduced by previous dropping decisions and calculations are simplified.

In addition, within one node the dropping decisions applied to the preceding GoP should be stored. Thus, depending on the choice for R, the decisions making on the dropping of the I-frame has to use a modified distortion value to consider the actual distortion.

In addition to that, a service history should be included, to get the overall degraded quality of the whole stream in order to make decisions considering the total user perceived quality of service, e.g., if a stream has suffered over-proportionally from droppings, this stream should get a higher priority. Such service history could be expressed by an additional factor to the values of the distortion matrix in the cost function.

In contrast to QoS-based approaches, the inventive scheme offers larger flexibility and supports dynamic frame importance control. When comparing the inventive rate-distortion optimized dropping concept with priority-based dropping strategies, significantly better reconstruction quality is observed. Improvements of up to 7 dB are obtained for the simulation setup.

The signalling of the above-described distortion matrix could be realized, for example, as an extension to the RTP protocol (RTP payload header).

As has been described above, the present invention addresses the problem of how to dynamically adapt a number of incoming video streams in a network node to varying transmission conditions, i.e. outgoing data rates while optimising the received quality of e.g. the video streams for the user.

The present invention provides a rate-distortion optimized video frame dropping on active network nodes and mobile-based stations, by the way of example only. In particular, the inventive system and method supports shaping of video packet traffic in network nodes. Since video characteristics with respect to user perceived quality are considered, the inventive approach is optimized when compared to a known prior art approach. Moreover, the inventive concept relies on the side information that may be sent along with the video bit streams, wherein the side information may comprise a rate vector containing the frame size, for example, in bytes, and a distortion matrix describing the reconstruction distortion (in MSE) for a group of pictures.

In contrast to quality of service-based approaches, the inventive schemes offer larger flexibility and support dynamic frame importance control. More specifically, QOS (QOS=Quality of Service) provisioning is associated with, e.g. buffering problems of video streaming over shared, e.g. wireless, network resources. Therefore, for video data, a computational expensive transcoding or bucket dropping, which often is a random frame dropping having a deep impact on video quality, may be applied. In the case of scalable video, known prior art approaches drop less important parts first, it may lead to a graceful degradation of quality. In addition, QOS labelling supports such important controlled dropping and labelling (or importance) of the packets. This can be decided by the sender before transmission wherein, however, the actual transmission situation is not taken into account. However, the importance of a packet changes along the transmission path, an importance of a packet depends on dropping of other packets and, furthermore, only a few QOS-labels are available.

The present invention supports shaping a video packet traffic in network nodes by, e.g., dropping packets. The inventive dropping pattern is optimized since video characteristics are considered, e.g. user-perceived quality. The side information which can be sent along with the video bit stream may be used by the active network nodes to dynamically decide, which frames of which video stream should be dropped. For example, the active network nodes incorporates one of the inventive apparatus as described above. In addition, the decisions may also include a session history in order to take a global fairness into consideration.

Figure 7:
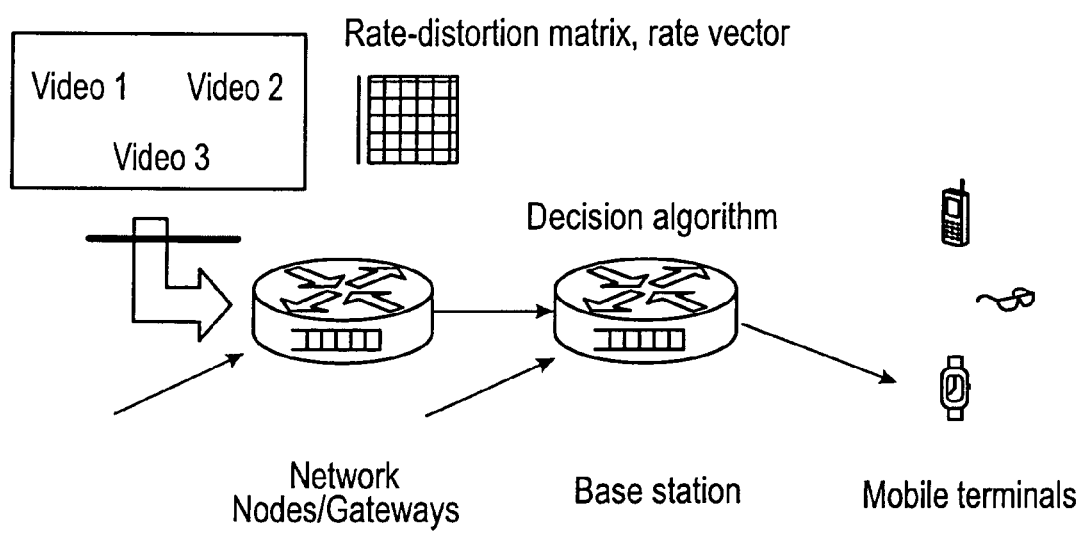
FIG. 7 is an inventive communication network scenario.

FIG. 7 demonstrates an inventive communication network scenario, in which the application provides additional information to the network (cross-layer awareness).

As is shown in FIG. 7, the network nodes/gateways receive a plurality of video streams along with side information with respect to a rate-distortion matrix or the rate vector, wherein a decision algorithm is applied for determining the frame dropping strategy in dependence on the rate distortion values comprised by the rate distortion matrix.

It is to be noted that all above-described embodiments may also be combined with each other in order to enhance a functionality of an apparatus incorporating the inventive approach. In addition, the present invention provides also methods for generating a transmit frame, for generating a transmit signal, for reconstructing a missing frame or for forwarding, so that the inventive concepts can be performed.

Moreover, depending on certain implementation requirements of the inventive methods, the inventive methods can be implemented in hardware or in software. The implementation can be performed using a digital storage medium, in particular, a disk or a CD having electronically readable control signals stored thereon, which can cooperate with a programmable computer system such that the inventive methods are performed. Generally, the present invention is, therefore, a computer-program product with a program code stored on a machine-readable carrier, the program code being configured for performing at least one of the inventive methods, when the computer program product runs on a computer. In other words, the inventive methods are, therefore, a computer program having a program code for performing the inventive methods when the computer program runs on a computer.

While this invention has been described in terms of several preferred embodiments, there are alterations, permutations, and equivalents, which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed is:

1. Apparatus for generating a transmit frame from an information signal, the information signal comprising a plurality of information frames, the apparatus being further configured for generating a further transmit frame from a further information signal, the further information signal comprising a plurality of further information frames, the apparatus comprising:

a provider configured for providing a plurality of reconstruction distortion values, each reconstruction distortion value indicating a reconstruction distortion resulting when replacing an information frame by a replacement frame, wherein the provider is configured for providing a further plurality of reconstruction distortion values, each further reconstruction distortion value indicating a reconstruction distortion when replacing a further information frame of the further information signal by a replacement frame; and an introducer configured for minimizing a cost function reflecting a combination of rate reduction and an increase of a total reconstruction distortion resulting when non-introducing a combination of frames into the transmit frame, wherein the introducer is configured for jointly determining which information frame of the information signal is not to be introduced into the transmit frame, and which information frame of the further information signal is not to be introduced into the further transmit frame for a joint rate and additional reconstruction distortion reduction, the introducer being further configured for determining a dropping pattern minimizing the cost function from the minimization of the cost function, the dropping pattern indicating a combination of information frames not to be introduced into the transmit frame, the introducer being further configured for dropping the combination of information frames indicated by the dropping pattern and for introducing the information frames which are not to be dropped into the transmit frame and for introducing the further information frames which are not to be dropped into the further transmit frame.

2. Apparatus according to claim 1, wherein the cost function comprises a difference of a reconstruction distortion value associated with not introducing a certain information frame of the information signal into the transmit frame, and a number of bits saved when not introducing the certain frame, and wherein the introducer is configured for determining a certain information frame such that the cost function is minimum.

3. Apparatus according to claim 1, wherein the transmit frame and the further transmit frame are to be transmitted via a common communication link, wherein the apparatus comprises a buffer for queuing information frames of the information signal and information frames of the further information signal, and wherein the introducer is configured for determining which information frame of the information signal is not to be introduced into the transmit signal, and which information frame of the further information signal is not to be introduced into the further transmit frame in dependence on a buffer fullness.

4. Apparatus according to claim 1, wherein the cost function comprises a difference of a first sum of a reconstruction distortion value associated with not introducing a certain frame of the information signal into the transmit frame and a reconstruction distortion value associated with not introducing a certain frame of the further information signal into the further transmit frame, and a second sum of a number of bits saved when not introducing the certain frame of the information signal into the transmit frame and a number of bits saved when not introducing the certain frame of the further information signal into the further transmit frame, wherein the introducer is configured for determining the certain frame of the information signal and the certain frame of the further information signal such that the cost function is minimized.

5. Apparatus according to claim 1, wherein the introducer is further configured for introducing a frame information into the transmit frame, the frame information indicating a kind of information frame not to be introduced into the transmit frame.

6. Apparatus according to claim 1, wherein the provider is configured for receiving the plurality of reconstruction distortion values from a remote transmitter.

7. Apparatus according to claim 1, wherein the provider is configured for estimating a reconstruction distortion values from a kind of information being comprised by an information frame.

8. Apparatus according to claim 1, wherein information signal represents a group of pictures, and wherein the plurality of information frames are I- or P- or B-frames.

9. Apparatus according to claim 1, wherein information signal represents a group of pictures, and wherein the plurality of reconstruction distortion values is arranged to form a distortion matrix describing the total reconstruction distortion for a dropping pattern in a mean squared error sense.

10. Communication network node comprising:
a receiver for receiving an information signal;
an apparatus for generating a transmit frame from an information signal, the information signal comprising a plurality of information frames, the apparatus being further configured for generating a further transmit frame from a further information signal, the further information signal comprising a plurality of further information frames, the apparatus comprising:
a provider configured for providing a plurality of reconstruction distortion values, each reconstruction distortion value indicating a reconstruction distortion resulting when replacing an information frame by a replacement frame, wherein the provider is configured for providing a further plurality of reconstruction distortion values, each further reconstruction distortion value indicating a reconstruction distortion when replacing a further information frame of the further information signal by a replacement frame; and
an introducer configured for minimizing a cost function reflecting a combination of rate reduction and an increase of a total reconstruction distortion resulting when non-introducing a combination of frames into the transmit frame, wherein the introducer is configured for jointly determining which information frame of the information signal is not to be introduced into the transmit frame, and which information frame of the further information signal is not to be introduced into the further transmit frame for a joint rate and additional reconstruction distortion reduction, the introducer being further configured for determining a dropping pattern minimizing the cost function from the minimization of the cost function, the dropping pattern indicating a combination of information frames not to be introduced into the transmit frame, the introducer being further configured for dropping the combination of information frames indicated by the dropping pattern and for introducing the information frames which are not to be dropped into the transmit frame and for introducing the further information frames which are not to be dropped into the further transmit frame; and
a generator for generating a transmit signal on a basis of the transmit frame and the further transit frame.

11. Method for generating a transmit frame from an information signal, the information signal comprising a plurality of information frames, and for generating a further transmit frame from a further information signal, the further information signal comprising a plurality of further information frames, the method being performed on a computer and a digital storage medium having computer readable control signals stored thereon, the method comprising:
providing, by a provider, a plurality of reconstruction distortion values, each reconstruction distortion value indicating a reconstruction distortion when replacing an information frame by a replacement frame, the provider embodied by the computer running a program stored on the digital storage medium;
providing, by the provider, a further plurality of reconstruction distortion values, each further reconstruction distortion value indicating a reconstruction distortion when replacing a further information frame of the further information signal by a replacement frame;
minimizing a cost function reflecting a combination of rate reduction and an increase of a total reconstruction distortion resulting when non-introducing a combination of frames into the transmit frame;
determining a dropping pattern minimizing the cost function from the minimization of the cost function, the dropping pattern indicating a combination of information frames not to be introduced into the transmit frame;
jointly determining which information frame of the information signal is not to be introduced into the transmit frame, and which information frame of the further information signal is not to be introduced into the further transmit frame for a joint rate and additional reconstruction distortion reduction;
dropping the combination of information frames indicated by the dropping pattern; introducing the information frames which are not to be dropped into the transmit frame; and introducing the further information frames which are not to be dropped into the further transmit frame, wherein the minimizing, the determining, the jointly determining, the dropping and the introducing are to be carried out by an introducer.

12. Method for forwarding signals, the method being performed on a computer and a digital storage medium having computer readable control signals stored thereon, the method comprising:

receiving an information signal;

generating a transmit frame from an information signal, the information signal comprising a plurality of information frames, and for generating a further transmit frame from a further information signal, the further information signal comprising a plurality of further information frames, the method comprising:

providing, by a provider, a plurality of reconstruction distortion values, each reconstruction distortion value indicating a reconstruction distortion when replacing an information frame by a replacement frame;

providing, by the provider, a further plurality of reconstruction distortion values, each further reconstruction distortion value indicating a reconstruction distortion when replacing a further information frame of the further information signal by a replacement frame, the provider embodied by the computer running a program stored on the digital storage medium;

minimizing a cost function reflecting a combination of rate reduction and an increase of a total reconstruction distortion resulting when non-introducing a combination of frames into the transmit frame;

determining a dropping pattern minimizing the cost function from the minimization of the cost function, the dropping pattern indicating a combination of information frames not to be introduced into the transmit frame;

jointly determining which information frame of the information signal is not to be introduced into the transmit frame, and which information frame of the further information signal is not to be introduced into the further transmit frame for a joint rate and additional reconstruction distortion reduction;

dropping the combination of information frames indicated by the dropping pattern;

introducing the information frames which are not to be dropped into the transmit frame;

introducing the further information frames which are not to be dropped into the further transmit frame, wherein the minimizing, the determining, the jointly determining, the dropping and the introducing are to be carried out by an introducer; and generating a transmit signal on a basis of the transmit frame and the further transmit frame.

13. Computer program stored on a digital storage medium for performing a method for generating a transmit frame from an information signal, the information signal comprising a plurality of information frames, and for generating a further transmit frame from a further information signal, the further information signal comprising a plurality of further information frames, the method comprising:

providing a plurality of reconstruction distortion values, each reconstruction distortion value indicating a reconstruction distortion when replacing an information frame by a replacement frame;

providing a further plurality of reconstruction distortion values, each further reconstruction distortion value indicating a reconstruction distortion when replacing a further information frame of the further information signal by a replacement frame;

minimizing a cost function reflecting a combination of rate reduction and an increase of a total reconstruction distortion resulting when non-introducing a combination of frames into the transmit frame;

determining a dropping pattern minimizing the cost function from the minimization of the cost function, the dropping pattern indicating a combination of information frames not to be introduced into the transmit frame;

jointly determining which information frame of the information signal is not to be introduced into the transmit frame, and which information frame of the further information signal is not to be introduced into the further transmit frame for a joint rate and additional reconstruction distortion reduction;

dropping the combination of information frames indicated by the dropping pattern;

introducing the information frames which are not to be dropped into the transmit frame; and introducing the further information frames which are not to be dropped into the further transmit frame, when the computer program runs on a computer.

14. Computer program stored on a digital storage medium for performing a method for forwarding signals, the method comprising:

receiving an information signal;

generating a transmit frame from an information signal, the information signal comprising a plurality of information frames, and for generating a further transmit frame from a further information signal, the further information signal comprising a plurality of further information frames, the method comprising:

providing a plurality of reconstruction distortion values, each reconstruction distortion value indicating a reconstruction distortion when replacing an information frame by a replacement frame;

providing a further plurality of reconstruction distortion values, each further reconstruction distortion value indicating a reconstruction distortion when replacing a further information frame of the further information signal by a replacement frame;

minimizing a cost function reflecting a combination of rate reduction and an increase of a total reconstruction distortion resulting when non-introducing a combination of frames into the transmit frame;

determining a dropping pattern minimizing the cost function from the minimization of the cost function, the dropping pattern indicating a combination of information frames not to be introduced into the transmit frame;

jointly determining which information frame of the information signal is not to be introduced into the transmit frame, and which information frame of the further information signal is not to be introduced into the further transmit frame for a joint rate and additional reconstruction distortion reduction;

dropping the combination of information frames indicated by the dropping pattern;

introducing the information frames which are not to be dropped into the transmit frame; and introducing the further information frames which are not to be dropped into the further transmit frame, when the computer program runs on a computer.

* * * * *